_United States Patent_ [15] 3,699,679
Bardos et al. [45] Oct. 24, 1972

[54] HYDRAULIC BRAKE ADJUSTOR AND EQUALIZER

[72] Inventors: John J. Bardos, Westmont; Joel J. Poplawski, Hickory Hills, both of Ill.

[73] Assignee: International Harvester Company, Chicago, Ill.

[22] Filed: Jan. 22, 1971

[21] Appl. No.: 108,818

[52] U.S. Cl................60/54.5 E, 303/6 C, 303/84 A, 188/345
[51] Int. Cl................................................F15b 7/00
[58] Field of Search..60/54.5, 54.5 E, 54.6 E, 54.6 P; 303/6 C, 84 A; 188/345

[56] References Cited

UNITED STATES PATENTS

| 3,064,434 | 11/1962 | Parrett | 188/345 |
| 3,161,024 | 12/1964 | Ryskamp | 303/84 A |
| 1,569,143 | 1/1926 | Robinson | 60/54.6 S |
| 3,421,320 | 1/1969 | Kershner | 60/54.6 P |
| 3,439,500 | 4/1969 | Hertell | 60/54.5 R |
| 3,120,244 | 2/1964 | Hahn | 60/54.5 E |
| 3,040,534 | 6/1962 | Hager | 60/54.6 E |

Primary Examiner—Martin P. Schwadron
Assistant Examiner—A. M. Zupcic
Attorney—Floyd B. Harman

[57] ABSTRACT

A valve assembly adapted to be interconnected between a pair of master cylinders and a pair of brake units for selectively permitting independent actuation of either of said brake units or simultaneous actuation thereof and having means for automatically adjusting the brake units.

9 Claims, 2 Drawing Figures

PATENTED OCT 24 1972
3,699,679
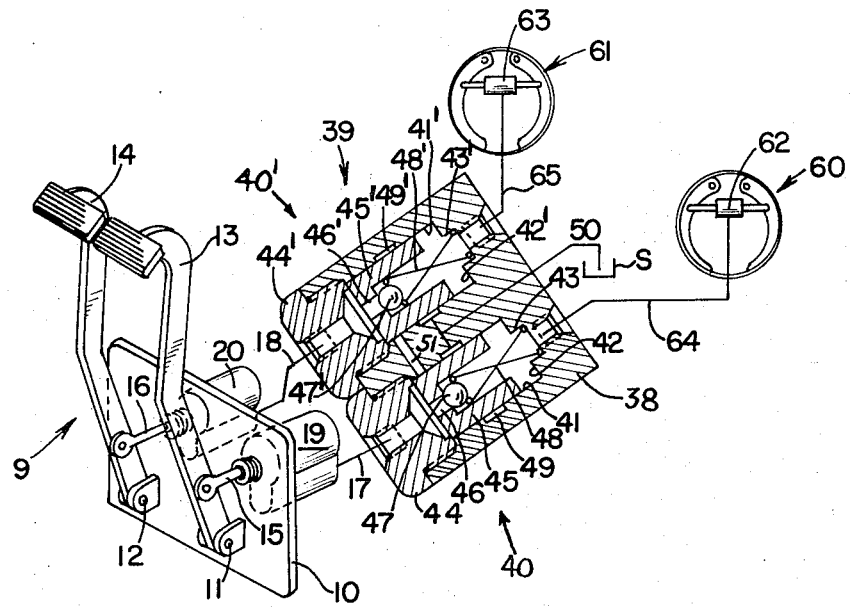
F I G - 1 -
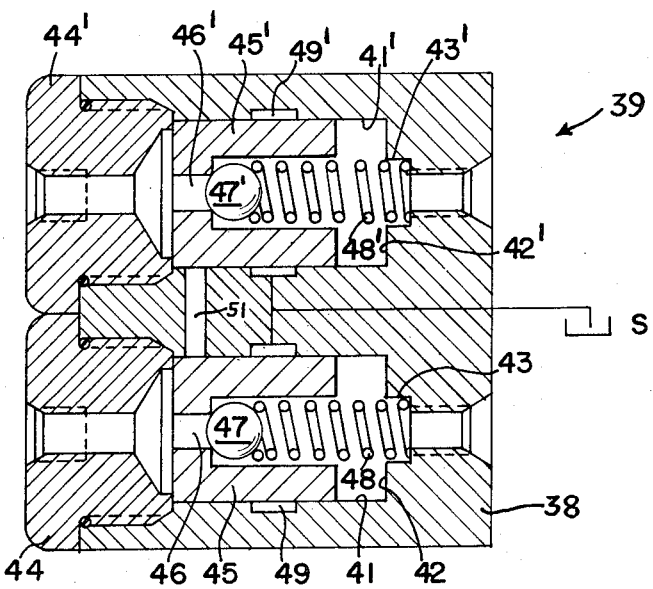
F I G - 2 -
INVENTORS
JOHN J. BARDOS
JOEL J. POPLAWSKI
BY Norney L. Baker ATT'Y.

HYDRAULIC BRAKE ADJUSTOR AND EQUALIZER

BACKGROUND OF THE INVENTION

This invention relates to an automatic, hydraulic brake equalizing system as well as a self-adjusting brake system.

Many applications exist today for the utilization of two separate brake units which are selectively operated so as to aid in steering of the vehicle, or simultaneously actuated so as to provide braking for the vehicle. For instance, in a farm tractor art, each of the main drive wheels carry a brake unit, and when the operator thereof intends to make sharp steering movements he may utilize either the right brake or the left brake so as to limit or stop the movement of the appropriate tire and thereby shorten the turning radius of the vehicle. However, when the vehicle is being operated on a highway at higher speeds, it is imperative that both brakes be operated simultaneously with equal pressure so as to permit stopping without a tendency to steer the vehicle in one direction or the other. Similarly, in such vehicles, the brake disk or shoes are subject to wear and deterioration, and it would be most beneficial to provide a brake system whereby such wear is automatically compensated for regardless of whether such wear is equal or unequal with respect to each of the friction surfaces.

The prior art does disclose attempts to hydraulically insure equalization of hydraulic pressure being applied to each of the brakes. U.S. Pat. No. 3,120,244 represents such a disclosure. Similarly, many attempts to automatically adjust brakes are well known, but such are often of the mechanical type.

Accordingly, the instant invention relates to a valve assembly interposed between the master cylinders, and the brake units which provides an equalizing passage to insure equal pressure to each of the brake units upon any application of force to both of the brake pedals. Further, means are provided within the valve unit itself for automatically maintaining substantially constant amount of pedal travel necessary to apply the brakes regardless of wear of the friction surfaces. Accordingly, it is an object of the instant invention to provide a valve equalizer assembly adapted for interposition between two master cylinders and two brake units for insuring equal application of fluid pressure to each of the brake units upon simultaneous actuation of both of the brake pedals. It is also an object of the instant invention to insure that upon selective actuation of one of the brake pedals, only one of the brake units will be applied. It is also an object of the instant invention to provide, within this valve assembly, an adjusting mechanism for insuring that each of the brake units will be fully applied upon a fixed amount of brake pedal travel. Finally, it is an object of the instant invention to incorporate a hydraulic self-adjusting mechanism and a brake equalizer assembly within the same unit.

SUMMARY OF THE INVENTION

To accomplish these objects, this invention comprises a valve assembly adapted for interconnection between two brake units and two master cylinders and incorporates therein an equalizing passage as well as an adjusting mechanism both automatically and hydraulically actuated.

DESCRIPTION OF THE DRAWINGS

In a manner in which the objects of the instant invention is attained will be made clear by a consideration of the following specification and claims when taken in conjunction with the accompanying drawings in which:

FIG. 1 is a perspective view of the combination of this invention, with portions thereof shown in cross section, and FIG. 2 is a sectional view of the brake equalizer and adjusting mechanism utilized in the system disclosed in FIG. 1.

DETAILED DESCRIPTION

As exemplified in the attached drawings, the preferred embodiment of our invention includes a brake actuation unit 9, a valve assembly 39, and two brake units 60 and 61. A support 10 carries each of two master cylinders 19 and 20 which may be of any conventional manufacture and are operatively connected to a right foot pedal 13 and a left foot pedal 14 through piston rods 15 and 16, the pedals being pivotally supported on the base 10 at 11 and 12 in a conventional manner. Normally, such master cylinders 19 and 20 would be utilized to actuate a brake unit 60 which might appropriately be operatively associated with a right wheel of a vehicle, and a brake unit 61 which may be associated with a left drive wheel thereof. Interposed between the master cylinders 19 and 20 and the brake units 60 and 61, is the equalizing and adjusting valve means 39 of the instant invention. This valve means may comprise two valve units 40 and 40'. (Inasmuch as each of these units are identical, the right unit will be referred to by an integer, with the left unit being referred to by the same integer with a prime mark, the valve 40 being discussed in detail.) Thus, each specific valve unit will be interposed between a master cylinder and brake unit. For example, the valve unit 40 is connected by a conduit 17 to master cylinder 19, and to the brake unit 60 through a conduit 64. Each of the valve units comprises a bore 41 within the valve housing 38. At one end of the bore 41, a fitting 44 having conduit therethrough may be physically connected to the conduit 17, while the other end of bore 41 is physically connected to the conduit 64. Within bore 41 is reciprocable piston 45 having a small bore 46 passing through the forward face thereof which is normally closed by a one way valve 47. Biasing means 48 interposed between the rear end of a counterbore 43, acts directly against the one way valve 47 to urge the valve and the piston unit 45 forwardly.

Thus, it should be apparent that piston units 45 and 45' divide each brake conduit into two hydrostatic links; a first link between each master cylinder and each piston and a second link between each piston and each brake cylinder. Upon application of the foot pedals 13 and 14, the master cylinders 19 and 20 direct fluid through the conduits 17 and 18 against the pistons 45 and 45'. Fluid force acting against the forward face of such pistons urge same rearwardly, and fluid in the second hydrostatic link will be forced from the bores 41 and 41' behind the pistons 45, 45' to the cylinders 61 and 62 to expand the brake shoes and thus apply the brake units against the associated wheel.

Interconnecting the bores 41 and 41' at the forward end thereof is a cross bore 51 which will serve to interconnect the bores any time both piston units 45 and 45' are depressed. Thus, as fluid is directed from the master cylinder 19 to the brake unit 60, fluid pressure acting upon the face of piston 45 will drive same rearwardly to apply fluid energy to cylinder 62. However, the rearward travel of piston 45 will also open the cross bore 51, but such will have no effect upon the application of brake unit 61 since the piston 45' is not moved rearwardly, and fluid force is merely applied to the side of piston 45' without any effect thereon. However, if brake pedal 14 is simultaneously depressed with pedal 13, the piston 45' will also be forced to reciprocate rearwardly and fluid pressure will be applied to cylinder 63. As soon as both piston units 45 and 45' have moved rearwardly whereby the cross drill 51 interconnects the bores 41 and 41', it is apparent that the fluid energy acting upon the faces of both of these pistons will be equalized, and equal force will be applied to the right brake unit as well as the left brake unit. Under such circumstances, an equal braking force will be applied to both the right and the left wheels of the tractor or associated vehicle, and such applicational force will have no tendency to steer the vehicle in one direction or another, thus providing for straight stopping.

With respect to the self-adjusting mechanism of the instant invention, it should be apparent that the pistons 45 and 45' are limited in reciprocable movement, and may travel rearwardly only until contact is made with the rear ends 42, 42' of counterbores 41 and 41'. Thus, both the brake application travel, and the brake retraction travel must be accounted for during movement of the piston 45 and 45' within limited movement provided by counterbores 41 and 41', and accordingly brake pedal travel of the pedals 13 and 14 should seldom exceed the distance required to provide fluid in the forward portion of bores 41 and 41' to move the pistons 45 and 45' rearwardly against their respective abutments. Consequently, due to this limited movement of the pistons 45 and 45', the proper brake travel distance is always assured. However, in order to compensate for wear on the brake shoes of the brake units 60 and 61, means are additionally provided for insuring that the quantity of fluid in the second hydraulic link is increased to compensate for such wear. Accordingly, the bores 46 and 46' within the piston faces 45 and 45' may, at times, admit make-up fluid to the second hydrostatic links. Such is accomplished through type one way valves 47 and 47' urged against the rear opening of bores 46 and 46'. If, for example, the brake unit 60 has worn friction surfaces, and the brake pedal 13 has been applied, the piston 45 will move rearwardly until it reaches the abutment 42 within counterbore 41. If, at this point, the brake unit 60 has not been applied, and the hydraulic link does not contain sufficient fluid to apply same, the ball-type check 47 will open against fluid pressure in the forward end of bore 41 to admit additional fluid to the second hydraulic link. Consequently, upon the next application of force to brake pedal 13, sufficient fluid will exist in the second hydraulic link whereby the brake will be applied upon proper travel of the piston 45.

In addition to the above structure, a groove 49' is provided around the counterbore 41' to insure that any fluid which might otherwise attempt to pass from master cylinder 19 around piston 45' to the second hydraulic link is bled to the sump S. Similarly, a groove 49 is provided around the piston unit 45 to insure that fluid cannot pass from the master cylinder 20 to the opposite hydraulic link or brake unit 60 since any fluid attempting to pass around piston unit 45 will be bled off to the sump S by conduit 50. Such is effective to prevent such undesirable cross passage of fluid and an undesirable lock-up of the brakes.

MODE OF OPERATION

Considering the structure described, it should be apparent that singular actuation of a brake pedal 13 or 14 will result in singular actuation of a right or left brake unit 60 or 61. Thus, fluid energy from the master cylinder 19 acts against the piston 45 which, in turn, pressurizes fluid in the second hydraulic link to apply fluid energy to cylinder 62 and thus apply the brake unit 60. In the event sufficient fluid does not exist in the second hydraulic link, the valve 47 will open upon engagement of the piston unit 45 with abutment 42, and additional make-up fluid will be applied to the second hydraulic link. Such continuing make-up of fluid will compensate for wear on the friction surfaces of the brake unit 60. Independent actuation of the brake pedal 14 will similarly result in independent application of the brake unit 61, and brake pedal travel will be continuously adjusted.

In the event that the two brake pedals are depressed simultaneously by an operator of the vehicle, both piston units 45 and 45' will be moved rearwardly, and equal force will act against the forward faces of both piston units 45 and 45' to insure equal application of force to cylinders 62 and 63. Thus, brake units 60 and 61 will be equally applied.

Thus, it should be quite apparent that applicants have proposed a novel equalizing and adjusting brake combination which permits continuous adjustment of the brake travel in an automatic fashion to insure application of the brakes upon a given amount of brake travel. Similarly, upon dual actuation of the brakes, it should also be apparent that equal application of force should be applied to both brake units. The brake units 60 and 61 herein are shown merely by way of illustration and this system could be modified to operate disc type brakes as well. Finally, to insure a less expensive construction of the system herein disclosed, applicants also proffer herein a system in which the equalizing and adjusting valve means might be made integral with the two master cylinder units so as to eliminate any additional plumbing requirements.

We claim:

1. In a dual brake system having two brake units and two master cylinders fluidly connected thereto and capable of simultaneous or independent actuation, the improvement comprising:
   a. a valve housing having at least two chambers therein, one end connected to said master cylinders and the other connected to said brake units, said chamber being interconnected
   b. movable means in each of said chamber for dividing said fluid connection into two hydrostatic links, and
   c. means for increasing the volume of fluid in the link associated with the brake unit so as to compensate for wear of said brake unit.

2. An apparatus as recited in claim 1 in which said means for increasing the volume of fluid in said link comprises a one way valve.

3. In a dual brake system having two brake units and two master cylinders fluidly connected thereto, brake pedals for the actuation of said master cylinders either simultaneously or independently, the improvement comprising:
   a. a valve housing having two chambers therein, each chamber interconnected between a master cylinder and a brake assembly to define hydrostatic links, and with each other,
   b. movable means within said chambers for normally precluding fluid flow between said chambers when said master cylinders are independently actuated, but permitting such flow when said master cylinders are simultaneously actuated, said movable means including means for adjusting brake travel upon activation of said master cylinders.

4. An apparatus as recited in claim 3 in which:
   a. said movable means comprises a piston reciprocable within said chamber and divides said chamber into an inlet side and an outlet side, and
   b. said piston includes a valve means therein for permitting fluid flow from said inlet side to said outlet side to compensate for wear of said brake units.

5. An apparatus as recited in claim 4 in which
   a. said piston has limited reciprocal movement and said valve opens upon maximum movement of said piston towards said outlet side.

6. In a dual brake system having two brake units and two master cylinders fluidly connecting thereto, brake pedals for actuation of said master cylinders either simultaneously or independently, the improvement comprising:
   a. a valve housing interconnected between said brake units and said master cylinders, said housing having two chambers therein said chambers being interconnected;
   b. piston means within said chambers for defining a first fluid hydraulic link between said master cylinder and said piston means, and a second hydraulic link between said piston means and said brake units, said piston means also incorporating means for selectively permitting flow of hydraulic fluid from said first link to said second link.

7. In a multi-brake system in which brakes are appliable responsively to fluid pressure developed at respective manually controlled sources, the improvement comprising:
   a. a valve housing having a plurality of bores therein, each bore having a brake port, a source port, and a pressure equalizer port and which equalizer ports are intercommunicative,
   b. a plurality of shuttle members respectively reciprocal axially in the bores and each bore being sealingly separated by the shuttle member therein into leading and trailing end portions in respective communication with the brake port and the source port of such bore, each shuttle member having a trailing end facing the bore end portion of the bore containing the same that communicates with the source port of such bore and a leading end facing the bore end portion communicating with the brake port of such bore, each brake port being communicative with a respective brake and accommodative of a fluid column extending between the leading end of the shuttle member within said bore and the brake to impose brake-applying force to the brake attendant to advancement of such shuttle member, each source port being receivable of fluid under pressure from a respective manually controlled source to direct such fluid into the bore end portion in communication therewith and against the trailing end of the shuttle member facing such bore end portion to advance the shuttle member leading end foremost to apply the brake with a force constituting a function of the pressure in the bore trailing end portion and against the trailing end of the shuttle member,
   c. means yieldable urging each shuttle member retractively axially of the bore containing the same and toward the end portion communicating with the source port of such bore,
   d. stop means precluding retractive movement of the shuttle members beyond a retracted position thereof, and
   d. means respectively operable under control of each of said shuttle members to establish communication between an end portion of the bore receiving such member and the equalizer port of such bore pursuant to attainment of a position of predetermined advancement of such member from the stop means therefor and to terminate such communication while such member is retracted relatively to said position of advancement.

8. The combination set forth in claim 7, wherein the means operable under control of each shuttle member comprises a portion of each such shuttle member adapted to register with and mask the equalizer port of the bore containing such shuttle member when such shuttle member is retracted and to unmask such port when such member is predeterminedly advanced.

9. The combination set forth in claim 8, wherein the trailing end portions of the bores are the ones with which communication is established by the means operable under control of the shuttle members.

* * * * *